(12) United States Patent
Wen et al.

(10) Patent No.: US 8,842,508 B2
(45) Date of Patent: Sep. 23, 2014

(54) DATA PHASE LOCKED LOOP CIRCUIT AND METHOD FOR GENERATING FREQUENCY OF REFERENCE SIGNAL THEREOF

(75) Inventors: Luke Wen, Shindian (TW); Pei-Chieh Hu, Shindian (TW)

(73) Assignee: VIA Technologies, Inc., Taipei (TW)

( * ) Notice: Subject to any disclaimer, the term of this patent is extended or adjusted under 35 U.S.C. 154(b) by 1270 days.

(21) Appl. No.: 11/808,079

(22) Filed: Jun. 6, 2007

(65) Prior Publication Data

US 2008/0002542 A1    Jan. 3, 2008

(30) Foreign Application Priority Data

Jun. 30, 2006    (TW) ............................... 95124055 A

(51) Int. Cl.
*G11B 7/00*    (2006.01)
*G11B 27/36*    (2006.01)
*G11B 20/10*    (2006.01)
*G11B 20/18*    (2006.01)

(52) U.S. Cl.
CPC .......... *G11B 20/18* (2013.01); *G11B 20/10425* (2013.01); *G11B 20/10009* (2013.01); *G11B 2220/2537* (2013.01)
USPC .................. 369/53.16; 369/53.22; 369/53.23; 369/53.27; 369/44.25; 369/44.32

(58) Field of Classification Search
USPC .......... 369/53.16, 53.22, 53.23, 53.27, 44.25, 369/44.32
See application file for complete search history.

(56) References Cited

U.S. PATENT DOCUMENTS

| | | | | |
|---|---|---|---|---|
| 4,974,221 A | * | 11/1990 | Hosoya et al. | 369/44.32 |
| 2002/0044506 A1 | * | 4/2002 | Shihara et al. | 369/44.32 |
| 2003/0091350 A1 | * | 5/2003 | Lai et al. | 398/153 |
| 2006/0187800 A1 | * | 8/2006 | Ogura | 369/124.04 |

\* cited by examiner

*Primary Examiner* — Srilakshmi K Kumar
*Assistant Examiner* — Carl Adams
(74) *Attorney, Agent, or Firm* — Birch, Stewart, Kolasch & Birch, LLP

(57) ABSTRACT

A data phase locked loop circuit includes a phase locked loop circuit, a judging circuit, a detecting circuit and a control circuit. The phase locked loop circuit outputs a reference signal according to a data signal, which is generated by an optical drive reading an optical disk. When the judging circuit judges that a jitter signal is smaller than a threshold value, the control circuit stores a frequency of the reference signal. When the detecting circuit detects a defect zone of the optical disk read by the optical drive, the phase locked loop circuit fixes the frequency of the reference signal to a latest stored one.

8 Claims, 3 Drawing Sheets

DATA PHASE LOCKED LOOP CIRCUIT AND METHOD FOR GENERATING FREQUENCY OF REFERENCE SIGNAL THEREOF

BACKGROUND OF THE INVENTION

1. Field of Invention

The invention relates to a data phase locked loop (PLL) circuit, and, in particular, to a data phase locked loop circuit used in an optical drive and a method of generating a frequency of a reference signal.

2. Related Art

With the rapid development of information processing and electronic technology, various electronic circuits, such as filters, phase locked loop circuits and other devices for processing various signals are continuously invented and improved. The phase locked loop circuit is a powerful device that can be applied to synchronous processes, frequency dividing processes or frequency multiplying processes. In addition, the phase locked loop circuit may be implemented by using a cheap integrated circuit. Thus, the phase locked loop circuit is widely used in the signal processing in, for example, an optical drive.

FIG. 1 shows a conventional data phase locked loop circuit 10. The data phase locked loop circuit 10 includes a phase locked loop circuit 11, a protecting circuit 12 and a detecting circuit 13. A data signal $S_D$ is read from an optical disk 100 and is inputted to the phase locked loop circuit 11 by an optical pickup head 101 of an optical drive. Then, a reference signal $S_R$ is generated according to the data signal $S_D$ and is outputted to an optical drive signal processing circuit 102 by the phase locked loop circuit 11. The reference signal $S_R$ may serve as a signal processing reference for the optical drive signal processing circuit 102. The data signal $S_D$ is continuously tracked to equalize the frequency of the reference signal $S_R$ to the data signal $S_D$ by the phase locked loop circuit 11. The condition of the optical pickup head 101 is detected in reading the optical disk 100 according to a radio frequency signal $R_F$ obtained by the optical pickup head 101, and then a control signal $S_C$ is outputted to the protecting circuit 12 by the detecting circuit 13. Next, the protecting circuit 12 decides whether to output a sustaining signal $S_S$ to the phase locked loop circuit 11 according to the control signal $S_C$.

However, when the optical pickup head 101 reads a defect zone of the optical disk 100, the amplitude of the data signal $S_D$ fluctuates severely or cannot be read. Therefore, the frequency of the reference signal $S_R$ is too high or the frequency of the reference signal $S_R$ cannot be predicted, thereby disabling the optical drive signal processing circuit 102 from operating normally. In order to overcome the above-mentioned problem, a high-level control signal $S_C$ is outputted by the detecting circuit 13 when the detecting circuit 13 detects that a defect zone of the optical disk 100 is read, and a sustaining signal $S_S$ is outputted by the optical pickup head 101 when the optical pickup head 101 detects that the control signal $S_C$ has a high level. Thus, when the sustaining signal $S_S$ is received by the phase locked loop circuit 11, the reference signal frequency $S_R$ is fixed to an arbitrary frequency at this time. A low-level control signal $S_C$ is outputted when the detecting circuit 13 detects that the optical pickup head 101 is reading a defect-free zone of the optical disk 100 so as to disable the protecting circuit 12 from outputting the sustaining signal $S_S$. Thus, the frequency of the reference signal $S_R$ generated by the phase locked loop circuit 11 progressively tracks from the arbitrary frequency to the frequency of the data signal. Because the arbitrary frequency is unpredictable or is too great, a longer period of delay time is needed to enable the tracking of the frequency of the reference signal $S_R$ from the arbitrary frequency to the frequency of the data signal. Thus, the optical drive signal processing circuit 102 still cannot work normally in this period of delay time.

Therefore, it is an important subject of the invention to provide a data phase locked loop circuit and a method of generating the frequency of the reference signal in the data phase locked loop circuit of the optical drive in order to shorten the delay time required to track the frequency of the reference signal from an arbitrary frequency to the frequency of the data signal, when the defect zone read by the optical drive ends, to enable the optical drive signal processing circuit 102 to recover to normal operation.

SUMMARY OF THE INVENTION

In view of the foregoing, the invention is to provide a data phase locked loop circuit and a method of generating a frequency of a reference signal in the data phase locked loop circuit of an optical drive in order to shorten the delay time of tracking the frequency of the reference signal from an arbitrary frequency to a frequency of a data signal, when a defect zone of an optical disk is read by the optical drive ends, to enable an optical drive signal processing circuit to recover to a normal operation.

To achieve the above, the invention discloses a data phase locked loop circuit applied to an optical drive. The data phase locked loop circuit includes a phase locked loop circuit and a control circuit. The phase locked loop circuit fixes a frequency of a reference signal to a fixed frequency when receiving the fixed frequency. When a jitter signal is smaller than a threshold value, the frequency of the reference signal is stored by the control circuit. When the optical drive detects a defect zone of an optical disk, the fixed frequency is outputted as the latest stored frequency by the control circuit.

To achieve the above, the invention also discloses a method of generating a frequency of a reference signal of a data phase locked loop circuit in an optical drive. First, the reference signal is generated according to a data signal, which is generated by the optical drive reading an optical disk. A jitter signal is generated according to the data signal and the reference signal. The frequency of the reference signal is stored when the jitter signal is smaller than a threshold value. Finally, the frequency of the reference signal is fixed to a fixed frequency, which is the latest stored frequency of the reference signal, when a defect zone is detected in the optical disk.

As mentioned hereinabove, the frequency of the reference signal is stored by the data phase locked loop circuit and the method of generating the reference signal frequency in the optical drive according to the jitter signal. Then, the frequency of the reference signal is fixed to a latest stored one when the read defect zone of the optical disk is detected. Thus, when the read defect zone ends, the frequency of the reference signal may be rapidly tracked from the latest stored one to the frequency of the data signal, and the delay time of tracking the frequency of the reference signal from the arbitrary frequency to the frequency of the data signal may be shortened.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
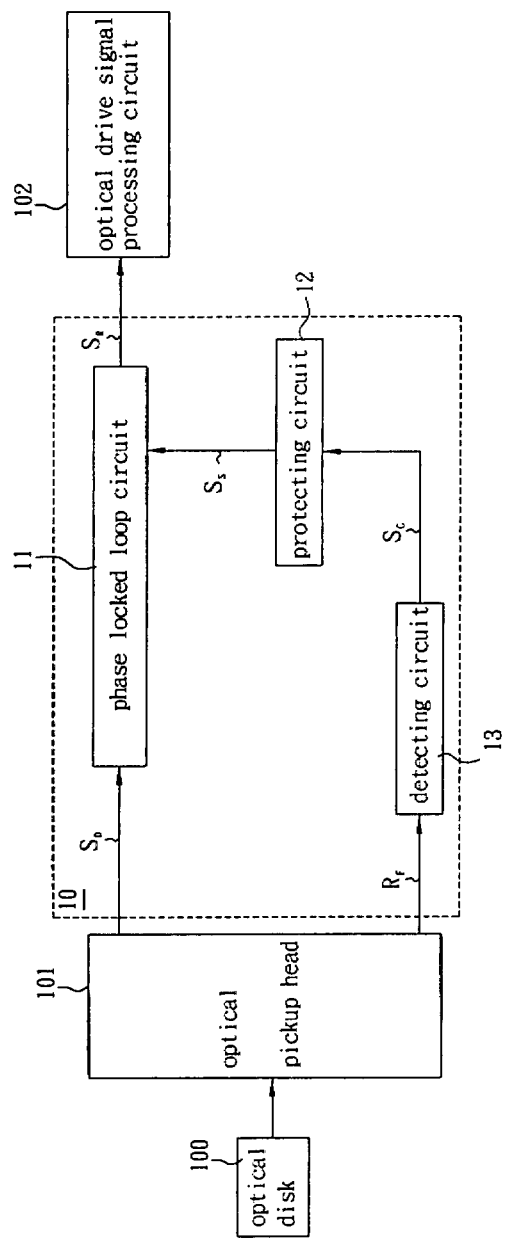
FIG. 1 is a schematic illustration showing a conventional data phase locked loop circuit.
Figure 2:
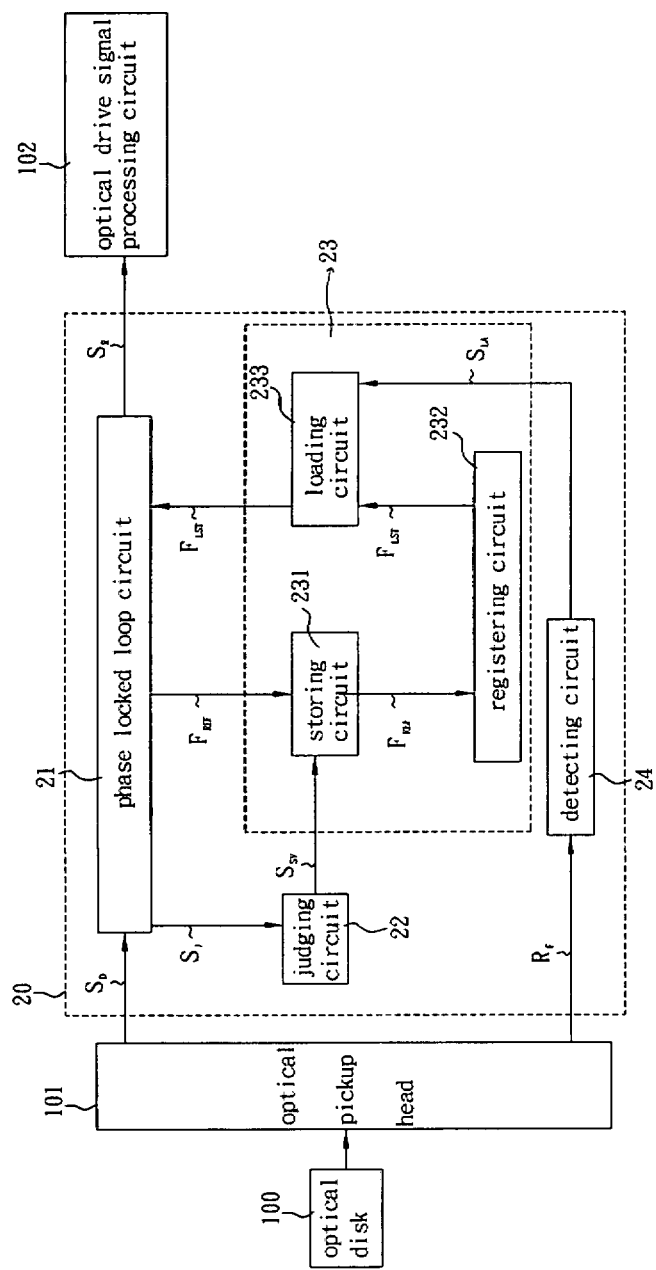
FIG. 2 is a schematic illustration showing a data phase locked loop circuit according to an embodiment of the invention.

FIG. 2 is a schematic illustration showing a data phase locked loop circuit 20 according to an embodiment of the invention. As shown in FIG. 2, the data phase locked loop circuit 20 may be implemented by way of a digital logic circuit. The data phase locked loop circuit 20 includes a phase locked loop circuit 21, a judging circuit 22, a control circuit 23 and a detecting circuit 24. The control circuit 23 includes a storing circuit 231, a registering circuit 232 and a loading circuit 233. An optical drive has an optical pickup head 101 for reading a data signal $S_D$ from an optical disk 100 and inputting the data signal $S_D$ to the phase locked loop circuit 21. Then, a reference signal $S_R$ is generated according to the data signal $S_D$ and is outputted to an optical drive signal processing circuit 102 by the phase locked loop circuit 21. The reference signal $S_R$ may serve as a signal processing reference in the optical drive signal processing circuit 102. The data signal $S_D$ is continuously tracked to equalize the frequency of the reference signal $S_R$ to the frequency of the data signal $S_D$. The phase locked loop circuit 21 outputs a jitter signal $S_J$ to the judging circuit 22 according to a phase difference between the reference signal $S_R$ and the data signal $S_D$. Then, a storing signal $S_{SV}$ is outputted to the storing circuit 231 of the control circuit 23 by the judging circuit 22 according to the jitter signal $S_J$. When the judging circuit 22 judges that the jitter signal $S_J$ is smaller than a threshold value, the storing signal $S_{SV}$ is set to a first level by the judging circuit 22. When the storing circuit 231 detects that the storing signal $S_{SV}$ is at the first level, a frequency $F_{REF}$ of the reference signal is stored to the registering circuit 232 by the storing circuit 231. Alternatively, when the judging circuit 22 judges that the jitter signal $S_J$ exceeds the threshold value, the storing signal $S_{SV}$ is set to a second level by the judging circuit 22. When the storing circuit 231 detects that the storing signal $S_{SV}$ is at the second level, the storing circuit 231 stops storing the frequency $F_{REF}$ of the reference signal to the registering circuit 232.

The detecting circuit 24 detects whether a defect zone of the optical disk 100 read by the optical drive exists according to a radio frequency signal $R_F$. The detecting circuit 24 outputs a loading signal $S_{LA}$ to the loading circuit 233 of the control circuit 23 according to the radio frequency signal $R_F$. The radio frequency signal $R_F$ is generated by the optical pickup head 101 reading the zone of the optical disk 100. When the radio frequency signal $R_F$ is at the first level, the detecting circuit 24 judges that the defect zone exists in the optical disk 100. When the radio frequency signal $R_F$ has the second level, the detecting circuit 24 judges that the zone of the optical disk 100 has no defect. Thus, when the detecting circuit 24 detects that the zone of the optical disk 100 has the defect, the detecting circuit 24 sets the loading signal $S_{LA}$ to the first level and inputs the loading signal $S_{LA}$ to the loading circuit 233. When the loading circuit 233 detects that the loading signal $S_{LA}$ is at the first level, the loading circuit 233 retrieves the latest stored frequency $F_{LST}$ of the reference signal from the registering circuit 232 and loads it into the phase locked loop circuit 21. Alternatively, when the detecting circuit 24 detects that the zone in the optical disk 100 has no defect, the loading signal $S_{LA}$ is set at the second level and is outputted to the loading circuit 233 by the detecting circuit 24. When the loading circuit 233 detects that the loading signal $S_{LA}$ is at the second level, it stops retrieving the latest stored frequency $F_{LST}$ from the registering circuit 232 and thus stops loading the latest stored frequency $F_{LST}$ to the phase locked loop circuit 21.

Thus, when a defect zone in the optical disk 100 is detected by the detecting circuit 24, the outputted frequency of the reference signal $S_R$ is fixed to the latest stored frequency $F_{LST}$ by the phase locked loop circuit 21, and the frequency $F_{REF}$ of the reference signal equals the latest stored frequency $F_{LST}$. Once the detecting circuit 24 detects that the optical drive has been moved from the defect zone to a defect-free zone of the optical disk 100, the frequency of the reference signal $S_R$ is no longer fixed by the phase locked loop circuit 21 but the data signal $S_D$ is directly tracked to generate the frequency of the reference signal $S_R$ so as to equalize the frequency of the reference signal $S_R$ to that of the data signal $S_D$. Because the latest stored frequency $F_{LST}$ is very close to the frequency of the data signal $S_D$, the frequency of the reference signal $S_R$ may be tracked from the latest stored frequency $F_{LST}$ to the frequency of the data signal $S_D$ by the phase locked loop circuit 21 in a short period of delay time. Herein, the frequency of the reference signal $S_R$ is equal to that of the data signal $S_D$. Thus, it is possible to shorten the prior art delay time of tracking the frequency $F_{REF}$ of the reference signal from the arbitrary frequency to the frequency of the data signal such that the optical drive signal processing circuit 102 can rapidly recover to normal operation.

Figure 3:
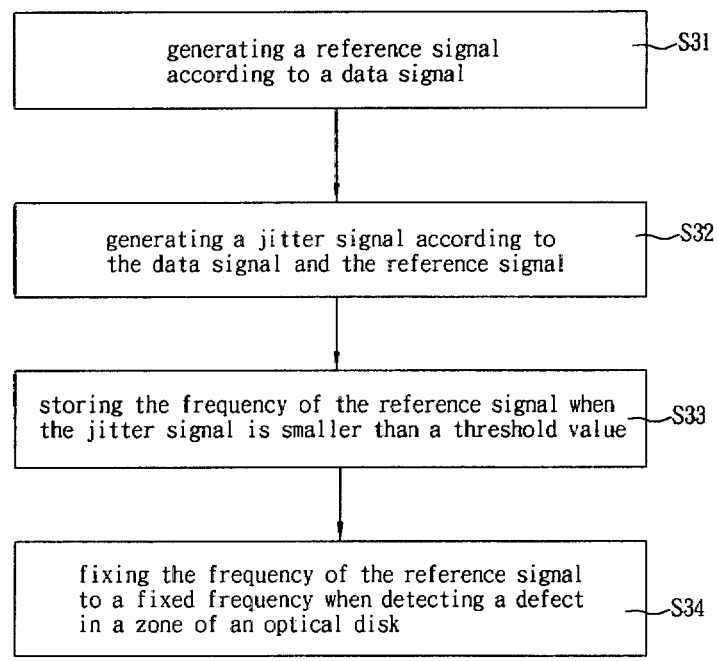
FIG. 3 is a flow chart showing a method of generating a frequency of a reference signal of the data phase locked loop circuit according to the embodiment of the invention.

In summary, the method of generating the frequency of the reference signal of the data phase locked loop circuit according to the embodiment of the invention is applied to the optical drive, as shown in FIG. 3. The method includes steps S31 to S34. First, in step S31, the reference signal is generated according to the data signal, which is generated by the optical drive reading the optical disk. Next, in step S32, the jitter signal is generated according to the data signal and the reference signal, wherein the jitter signal is generated according to a phase difference between the data signal and the reference signal. Then, in step S33, the frequency of the reference signal is stored when the jitter signal is smaller than the threshold value. However, when the jitter signal exceeds the threshold value, the storing process of the frequency of the reference signal is stopped. At last, in step S34, the frequency of the reference signal is fixed to the fixed frequency equal to the latest stored frequency, when detecting the defect in the zone of the optical disk. However, the data signal is tracked to generate the frequency of the reference signal when detecting no defect in the zone of the optical disk.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data phase locked loop circuit applied to an optical drive, the data phase locked loop circuit comprising:
   a phase locked loop circuit for generating a reference signal according to a data signal, wherein the optical drive reads an optical disk to generate the data signal; and a control circuit for storing a frequency of the reference signal when a phase difference between the reference signal and the data signal is smaller than a threshold value, and not storing the frequency of the reference signal when the phase difference between the reference signal and the data signal is larger than the threshold value;

a detecting circuit for detecting a defect zone of the optical disk read by the optical drive, wherein a frequency of the reference signal outputted by the phase locked loop circuit is fixed to the latest stored frequency of the reference signal while the defect zone in the optical disk is detected.

2. The data phase locked loop circuit according to claim 1, wherein when the optical drive reads a defect-free zone in the optical disk, the data signal is tracked to generate the frequency of the reference signal by the phase locked loop circuit, and the optical disk is read to generate the data signal by the optical drive.

3. The data phase locked loop circuit according to claim 1, wherein the control circuit comprises:

a registering circuit for storing the frequency of the reference signal;

a storing circuit for judging whether to store the frequency of the reference signal to the registering circuit; and a loading circuit for judging whether to load the latest stored frequency of the reference signal to the phase locked loop circuit.

4. The data phase locked loop circuit according to claim 1, further comprising:

a judging circuit for enabling the control circuit to store the frequency of the reference signal when judging that the phase difference between the reference signal and the data signal is smaller than the threshold value, and disabling the control circuit from storing the frequency of the reference signal when judging that the phase difference between the reference signal and the data signal exceeds the threshold value.

5. The data phase locked loop circuit according to claim 1, wherein the control circuit is enabled by the detecting circuit to output the latest stored frequency of the reference signal when detecting the defect zone of the optical disk, and stops loading the latest stored frequency to the phase locked loop circuit when detecting a defect-free zone of the optical disk.

6. A method for generating a frequency of a reference signal of a data phase locked loop circuit in an optical drive, the method comprising the steps of:

generating the reference signal according to a data signal, wherein the optical drive reads an optical disk to generate the data signal;

storing the frequency of the reference signal when a phase difference between the reference signal and the data signal is smaller than a threshold value, and not storing the frequency of the reference signal when the phase difference between the reference signal and the data signal is larger than the threshold value; and fixing the latest stored frequency of the reference signal to a frequency of the reference signal outputted by the phase locked loop circuit when detecting a defect zone of the optical disk.

7. The method according to claim 6, further comprising the step of:

tracking the data signal to generate the frequency of the reference signal when detecting a defect-free zone of the optical disk.

8. The method according to claim 6, wherein when the phase difference between the reference signal and the data signal exceeds the threshold value, the step of storing the frequency of the reference signal is stopped.

* * * * *